Aug. 9, 1938. C. S. HAZARD ET AL 2,126,256
DELIVERY RECORDER
Filed Aug. 15, 1934 3 Sheets-Sheet 1
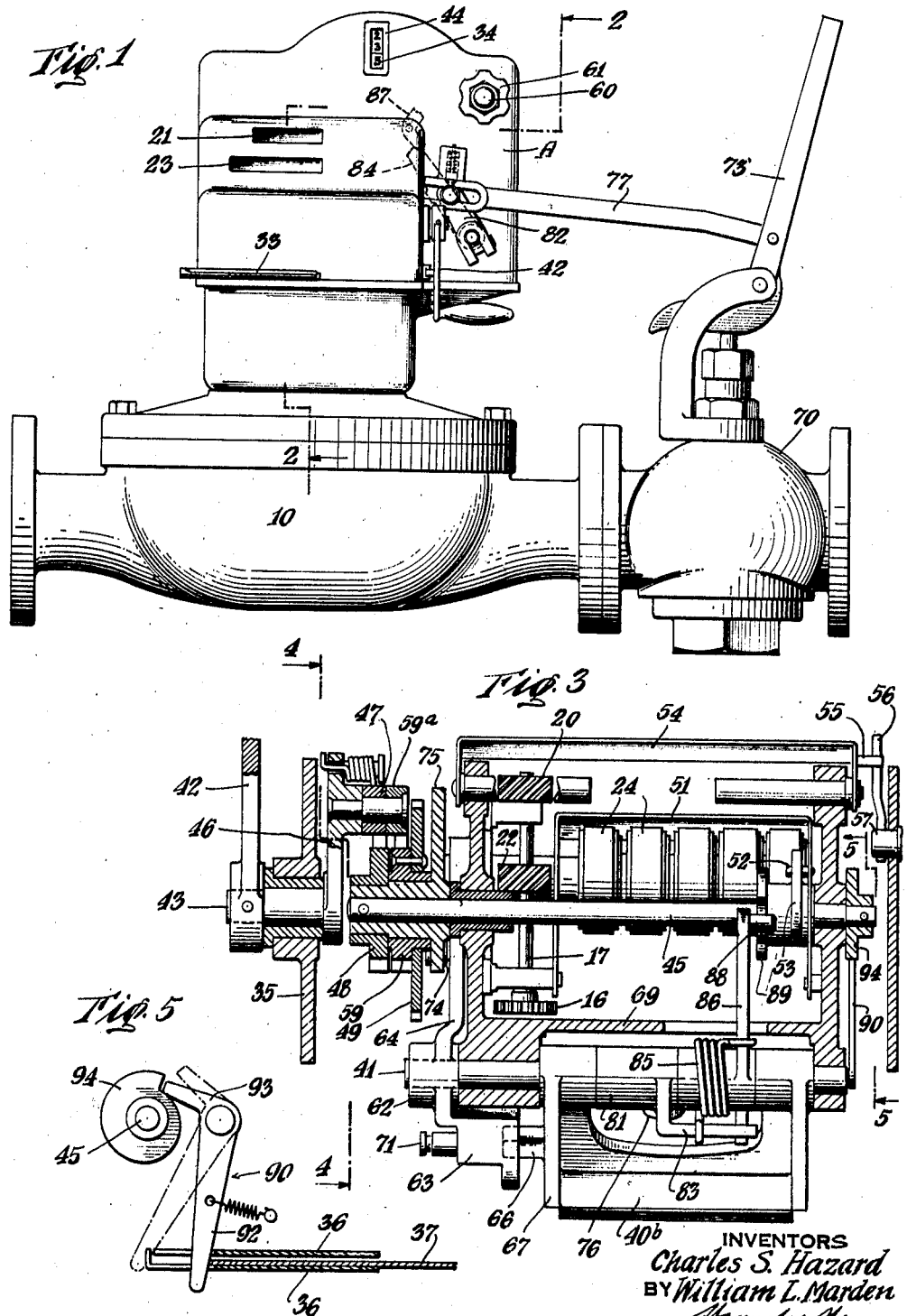
INVENTORS
Charles S. Hazard
BY William L. Marden
ATTORNEYS

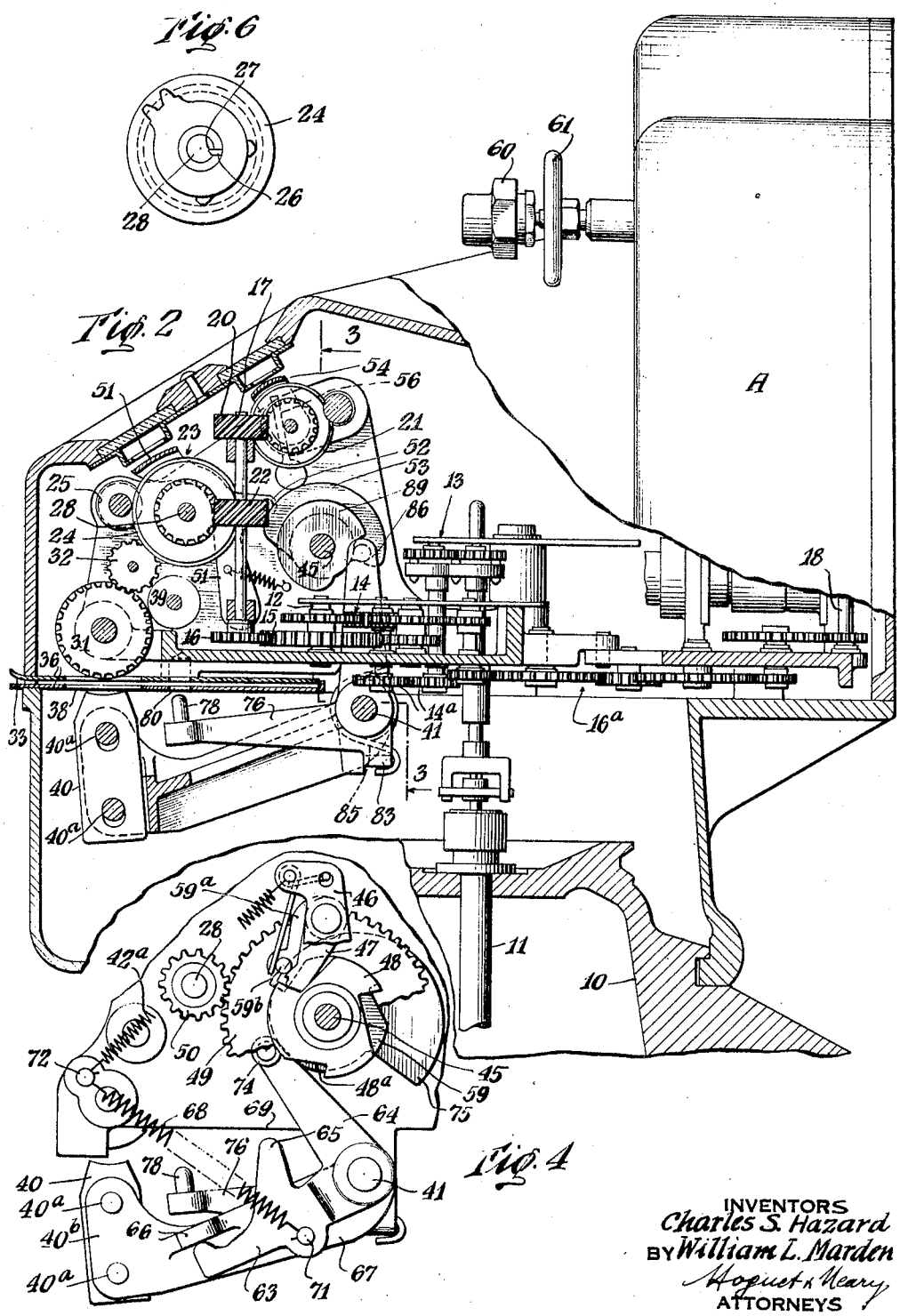

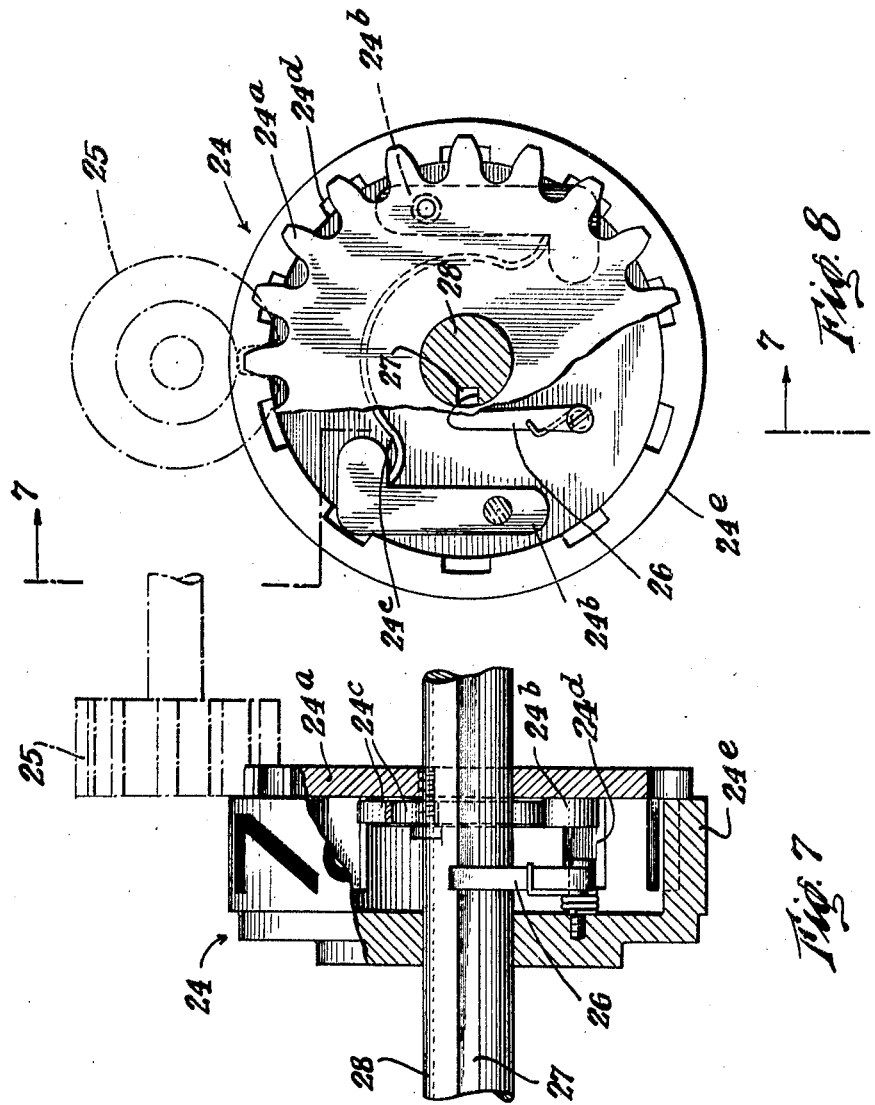

Patented Aug. 9, 1938

2,126,256

UNITED STATES PATENT OFFICE

2,126,256

DELIVERY RECORDER

Charles S. Hazard, New York, and William L. Marden, Jackson Heights, Flushing, N. Y., assignors to Neptune Meter Company, a corporation of New Jersey Application August 15, 1934, Serial No. 739,876

13 Claims. (Cl. 234—2)

This invention relates to delivery recorders and particularly to a recorder associated with the fluid meter on a fuel-oil or gasoline truck for providing a positive check on the delivery of fuel-oil or gasoline from the truck. It is desirable to provide for such a check on deliveries from the truck in order to prevent the truck driver or other attendant cheating a customer or his employer by diverting a portion of a delivery and selling it for his own profit.

Conventional metering devices should afford protection against fraud but do not always do so because the customer may not bother to inspect the register thereof before and after delivery or may not be able to understand the register reading. A printed delivery record for both the seller and his customer is preferable; but it is of no avail to provide the meter with a sales slip printing device unless such a delivery recorder is rendered fool-proof so that the truck attendant is precluded from improperly manipulating the device or printing sales slips which conform with his fraudulent purposes.

In carrying out our invention we provide registering and recording devices driven in unison by a fluid meter on the truck and adapted to print the delivery figure on a sales slip or ticket when the delivery has been completed. The registering and recording devices are reset to their zero positions before delivery commences and we provide means for preventing resetting of these devices until the sales ticket is positioned to receive a record, and also to prevent withdrawal of the ticket until a record has been made of the quantity of fuel-oil or gasoline actually delivered. As a further check on the truck driver all copies of the sales ticket may be sent to the customer who, on arrival of the truck, hands the ticket to the truck attendant and ascertains that the register is set to zero before delivery starts. When delivery is completed the customer may compare the reading of the register with the figure printed on the sales ticket to assure himself that he has received the quantity of fuel-oil or gasoline which he ordered.

The above mentioned and other objects and advantages of the invention will become apparent upon consideration of the following detailed description of an illustrative embodiment of the invention when read in conjunction with the appended claims and the accompanying drawings in which:

Figure 1 is a front elevational view of a fluid meter provided with a delivery recorder embodying the present invention;

Figure 2 is a vertical sectional view along the line 2—2 of Figure 1 illustrating details of construction;

Figure 3 is a sectional view on the line 3—3 of Figure 2;

Figure 4 is a part sectional and part elevational view on the line 4—4 of Figure 3 and illustrates the operating devices for the delivery recorder and also the mechanism for controlling a printing platen;

Figure 5 is a part sectional and part elevational view on the line 5—5 of Figure 3 and shows locking mechanism controlled by the sales ticket;

Figure 6 is a detail view showing a numeral wheel and resetting mechanism therefor;

Figure 7 is a detail view of the numeral wheel and resetting mechanism therefor taken on the line 7—7 of Figure 8; and Figure 8 is an elevation of a detail view of the numeral wheel and resetting mechanism partly in section.

Referring to Figures 1 and 2, the numeral 10 designate a meter having a shaft 11 operated in response to the flow of fluid for actuating the delivery registering and recording device of the present invention and the cut-off device associated therewith. The meter shaft 11 drives a stub shaft 12 through the intermediary of adjustable compensating mechanism 13 and speed reduction gearing 14.

The compensating mechanism 13 is adapted to calibrate the registering and recording devices to coordinate them with the particular measuring unit with which they are associated in order to accurately register and record the quantities of liquid flowing through the meter. This mechanism is also adapted to enable adjustments to be made to insure accurate registration when measuring the flow of fluids of different viscosity or to enable correction for changes in the viscosity and/or temperature of the particular fluid being measured. Compensating mechanism of the type shown in the drawings is more fully disclosed in the United States Letters Patent No. 1,970,526, granted to W. L. Marden, August 14, 1934. The speed reduction gearing 14 is provided for reducing the relatively high operating speed of the measuring unit to a rate suitable for operating registering, recording and cut-off mechanisms, the gears 14a thereof being removable, if desired, to substitute other gears for effecting a further compensation.

Stub shaft 12, driven in accordance with the flow of liquid through the meter as described above, is provided with a pinion 15 engaging a pinion 16 on a power take-off shaft 17 and operates through idler gears 16a to also drive a power take-off shaft 18. Power take-off shaft 18 actuates cut-off mechanism A, such as that disclosed in the copending application of Charles S. Hazard, Serial No. 729,582, filed June 8, 1934 now Patent No. 2,012,563, granted Aug. 27, 1935. The cut-off mechanism A is adapted to maintain an automatically closing valve 70 (Figure 1)

open until delivery of a predetermined quantity of fluid for which the dials 34, 44 thereof are adjusted by setting knobs 60, 61, whereupon the cut-off mechanism trips a detent 87 engaging a locking arm 84 connected by a linkage 82, 77 to the valve operating lever 73 for releasing the latter to permit valve 70 to close and shut off delivery of fluid through the meter 10, all as more fully described in said application.

As shown in Figure 2, power take-off shaft 17 is provided with a worm 20 for operating a registering device 21 to indicate the total quantity of fluid passing through the meter. A spiral gear 22 on shaft 17 operates a delivery register 23 the numeral wheels 24 of which are interconnected by transfer pinions 25. Numeral wheels 24 are provided with pawls 26 (Figures 6, 7 and 8) engageable with a spline 27 on the shaft 28 on which they are mounted for resetting all the numeral wheels to zero when shaft 28 is turned in the same direction as the numeral wheels are advanced by shaft 17.

As shown in Figures 7 and 8, each numeral wheel unit 24 includes a gear 24a pivotally carrying opposite pawls 24b biased by a spring 24c into engagement with spaced notches in the interior surface of the numeral drum 24e. When gear 24a is rotated by transfer pinion 25 in a clockwise direction as seen in Fig. 8, the pawls 24b act to advance the numeral drum 24e in the same direction. Upon actuation of the resetting shaft 28 in a clockwise direction as seen in Fig. 8, the spline 27 picks up the pawl 26 on the numeral drum 24e and carries the latter to zero position. However, inasmuch as the notches 24d in drum 24e slip beneath the pawls 24b on the gear 24a during resetting, the latter may remain engaged with the transfer pinion 25.

The registers 21 and 23 as well as the resetting device for the latter do not per se form any part of the present invention and it should be understood that other registering and reset devices that are of suitable construction may be substituted if desired.

The recording device comprises a series of printing wheels 31 connected to the corresponding numeral wheels 24 through idler gears 32 so that the printing wheels also are operated by shaft 17 and reset on actuation of shaft 28, in unison with the numeral wheels. Below the printing wheels and adjacent a slot 33 in the casing 35 that encloses the registers and recorder are a pair of plates 36 for supporting a ticket 37 on which an impression is made from the printing wheels through apertures 38 in plates 36 by means of an oscillatable printing platen. The platen comprises a series of printing hammers 40 loosely mounted on through rods 40a carried by a frame 40b, which in turn is mounted on and rotates with a shaft 41. There is an individual hammer 40 opposite each printing wheel. An inking device for the printing wheels is indicated at 39. It will be understood, however, that the inking device may be dispensed with provided the ticket is associated with a sheet of carbon paper in known ways.

Referring also to Figures 1 and 3, a depressible operating lever 42 having a determined cycle of operation for controlling the operation of the printing hammers 40 and other devices associated therewith is fixed to a stub shaft 43 extending through the wall of casing 35 in alignment with a cam shaft 45 disposed parallel to shaft 41. Stub shaft 43 has secured thereto an arm 46 carrying a pawl 47 engaging with a three-tooth ratchet 48 fixed to cam shaft 45 and adapted to turn the cam shaft one-third of a revolution each time lever 42 is depressed.

A gear 49 loosely mounted on cam shaft 45 meshes with a gear 50 fixed to resetting shaft 28 for operating the latter. Gear 49 has fixed thereto a ratchet 59 engaged by a second pawl 59a carried by arm 46. Pawl 59a is provided with a stud 59b resting on pawl 47. One of the notches of ratchet 48, as 48a, is of less depth than the other two. During that one-third of a revolution of cam 45 as effected by lever 42 upon operation thereof after delivery has been completed, the printing mechanism is actuated. During this operation, the pawl 47 acts to hold pawl 59a out of engagement with ratchet 59 so that gear 49 is not driven with the cam shaft 45. The printing wheels therefore remain stationary during the printing of the ticket. Thereafter, the printing wheels must be reset before a ticket can again be printed. For this purpose operating lever 42 is depressed and is preferably operated twice to turn cam shaft 45 through two-thirds of a revolution. The resetting shaft 28 is thereby turned through two complete revolutions, thus insuring complete resetting of the delivery register wheels 24 and the printing wheels 31 to their zero positions, despite any failure of a wheel to be picked up and returned to zero during the first revolution of shaft 28.

When used on a delivery truck, the lever 42 ordinarily is not operated to reset the numeral wheels after a printing operation until the truck reaches a new destination for the delivery of additional oil or liquid. The ticket is then inserted in the slot 33 and the lever 42 operated twice to reset the mechanism. Liquid is then delivered and upon completion of the delivery, lever 42 is depressed a third time to turn cam shaft 35 through the final third of a revolution for actuating the printing mechanism to print the ticket. During the final third of a revolution of the shaft 45 when the printing operation is being performed, the resetting shaft 28 remains at rest due to raising of pawl 59a in which position it may be held by a detent engaging ratchet 59.

A shutter 51 (Figures 2 and 3) is pivotally mounted to be interposed between the numeral wheels 24 and the related sight opening in casing 35. Shutter 51 is provided with a stud 52 engaging a cam 53 fixed to cam shaft 45 and operable thereby to conceal the numeral wheels of register 23 during resetting thereof. A similar pivoted shutter 54 is normally interposed between totalizer 21 and its sight opening, the shutter having a stud 55 engageable by the arm 56 operable by the cylinder of a key-controlled lock 57 when it is desired to read the totalizer.

Extending in offset relation from the hub 62 of a bell-crank journalled on shaft 41 are the two arms 63, 64 thereof. A lug 66 on one side member 67 of the printing hammer frame 40b overlies the end portion of bell-crank arm 63. Arm 63 on counter-clockwise movement permits the frame 40b to gravitate to a retracted position and on clockwise movement its end portion acts on lug 66 to move the printing hammer frame and cause the hammers 40 to strike the back of the ticket 37 interposed between the hammers and the printing wheels thereby pressing the ticket against the printing wheels to make a record on the ticket. The clockwise movement of arm 63 is effected by a spring 68 (Figure 4) connected between a stud 71 thereon and an anchor post 72. Spring 68 also acts to maintain a roller 74 carried by the other arm 64 of the bell-crank in contact with a cam 75 fixed to cam shaft 45. During slightly more than two-thirds of a revolution of cam shaft 45, cam 75 acts through the bell-crank to cause retraction of the printing hammer frame and the hammers 40 and tensions the spring 68. In the final third of a revolution of cam shaft 45 the roller 74 rides off the high point of cam 75, and spring 68 then acts to pull the frame 40b clockwise causing the hammers 40 to strike the back of the ticket 37 and press it against the printing wheels 31 for making a record on the ticket. A lug 65 is provided on the arm 63 and strikes the frame 69 before the hammers 40 strike the back of the ticket. The hammers travel the remaining distance by their own momentum, strike the ticket and then drop back by their own weight.

A lever 76 rotatably mounted on shaft 41 is provided with a pin 78 (Figure 2) adapted to be projected through openings 80 in plates 36 and through a specially provided hole in the ticket 37 interposed between these plates for locking the ticket against withdrawal until completion of the delivery and recording operation. If desired, pin 78 may be sharpened at its end to penetrate and lock a ticket that is not specially perforated. The hub 81 of lever 76 has a lateral projection 83 (Figure 3) to which one end of a coiled spring 85 is connected. The other end of spring 85 engages a lever 86 also rotatably mounted on shaft 41 so that the spring provides a resilient connection between levers 76 and 86, the body of the spring being mounted on the hub of lever 86. Lever 86 carries a roller 88 engaging a cam 89 on cam shaft 45, the cam being so proportioned and disposed that when shaft 45 is turned by operating lever 42 to reset the numeral and printing wheels the cam acts through levers 86, 76 to position pin 78 to lock the ticket 37 in place and prevent its withdrawal until a record has been made at the end of the delivery operation. The pin 78 may be moved to lock the ticket in place at any time during the resetting operation by suitably forming the cam 89. Preferably the cam 89 is formed to cause the pin 78 to be actuated to engage the ticket during the first resetting movement of the operating lever 42 and to prevent release of the ticket until after it has been printed.

A spring 42a connected between arm 46 and anchor post 72 is provided for acting on operating lever 42 to move the latter upwardly to assure a complete return stroke of the latter after it is actuated for resetting the registering and printing wheels or for effecting printing.

The present invention contemplates use of a rigid or semi-rigid ticket consisting of several sheets of thin paper and a stiffer backing, such as cardboard, with sheets of carbon paper arranged to cause printing on the intermediate sheets and the backing. A lever 90 pivoted at 91 has one arm 92 (Figure 5) thereof positioned to be engaged by the ticket 37 when the latter is inserted in slot 33 and positioned between plates 36 with its printing line in registration with the printing wheels. The other arm 93 of lever 90 is positioned in the path of movement of a cam 94 on cam shaft 45. Arm 93 thus acts to prevent revolution of shaft 45 by actuation of operating lever 42 to reset the register 23 and recorder 31 or to print, until the arm 93 is withdrawn upon actuation of lever 90 by a ticket properly positioned in slot 33.

Inasmuch as the functions of the various parts have been set forth in the above description of the structure of an illustrative embodiment of our invention, it is believed that the followinig brief resume will suffice to give a complete understanding of its operation. On arrival to make a delivery the register 23 shows a reading corresponding to the last previous delivery and the printing wheels 31 are positioned correspondingly. When the sales ticket 37 is placed in slot 33 it engages lever 90 and rocks the end 93 thereof out of the path of cam 94, unlocking shaft 45 to permit its operation by operating lever 42. When lever 42 is depressed the registering and recordiing devices are reset in unison; two operations of lever 42 being preferred for complete resetting of the printing and numeral wheels. The customer may then see that the reading of register 23 is zero by inspecting the latter. During the resetting operation shutter 51 was interposed by cam 53 between the register and its sight opening, thus concealing it so that the truck attendant could not select a fraudulent reading from which to start delivery in the event the customer was not watching the operation. During the resetting operation the cam 89 acted to position pin 78 for locking the ticket in place and cam 75 retracted the printing hammer frame 40b and conditioned it for the printing operation.

The indicating dials 34, 44 of the cut-off mechanism A are adjusted by knobs 60, 61 to a figure corresponding to the volume of fluid to be delivered, thus conditioning the cut-off mechanism A to cause automatic closing of valve 70 when the exact required quantity has been delivered, as described in the above mentioned Hazard application. Delivery of fluid is started and upon its termination operating lever 42 is again depressed causing printing of the delivery figure on all of the copies of ticket 37, and retraction of pin 78 to permit withdrawal of the ticket. The customer may then again inspect the reading of register 23, which retains the delivery figure, and compare it with the figure printed on the copy of the sales ticket which he receives. In this way he may assure himself that the device is in working order and that he has received the quantity of fuel-oil or gasoline which he ordered. In the event the customer's tank will not receive the entire quantity ordered, delivery may be stopped as soon as the tank is filled and the register 23 and sales ticket 37 will both indicate the actual delivery.

It should be noted that until the sales ticket is positioned in registration with the printing wheels the latter and the register 23 can not be reset. Thus, the ticket itself acts as a control element for releasing the lever 90 which locks shaft 45 and, through the latter, operating-lever 42.

The sequential operation of the various parts affords further protection against fraud. The ticket must be inserted to unlock the device by actuating the lever 90; operating lever 42 is then depressed twice to reset the register 23 and printing wheels 31 and to also lock the ticket in place. An actual delivery must then be made, for to operate lever 42 again before delivery of fluid would result in printing a series of zeros. After delivery is made lever 42 must again be depressed to print on the ticket and to release the latter. A second printing cannot be effected without resetting the register, etc., since depression of lever 42 after printing has once taken place results in immediately resetting the register and printing wheels. As a consequence it is impossible to use a prior delivery reading of the register and printing wheels to defraud a customer.

For example, when delivery of say, 100 gallons has been made to one customer and a proper ticket issued the register 23 and printing wheels 31 retain the 100 gallon figure. However, the attendant cannot use this figure to defraud the next customer by actually delivering 200 gallons of a 300 gallon order, for example, and printing a ticket for 300 gallons. If, on arrival to make a delivery with the register reading 100 gallons, the attendant should deliver 200 gallons of a 300 gallon order and then with the register and printing wheels actually reading 300 gallons should insert a ticket and attempt to print a ticket for 300 gallons he would find it impossible. The 300 figure would be wiped out as soon as lever 42 was operated and the ticket would receive zero impressions from all printing wheels because resetting always precedes printing in the arrangement described.

Due to the fact that pawl 47 and ratchet 48 constitute a one-way driving connection between operating-lever 42 and the cam shaft 45, which carries the gear 49 for operating resetting shaft 28, the lever 42 cannot be reversely operated to set up an improper figure on the numeral wheels 24 from which to start registration in the delivery operation. Moreover, since shutter 51 conceals register 23 during the resetting thereof until the wheels 24 reach their zero positions, the attendant is without knowledge of the reading of the register until resetting is completed. Consequently, he cannot safely effect only a partial resetting as he would not dare to start delivery from an unknown register figure which in all probability would finally result in printing of a figure having no relation to the actual delivery and thus serve as a tell-tale of his fraudulent actions. Hence, despite inattention on the part of the customer the truck attendant is compelled to operate the delivery recorder in the proper manner and produce a ticket showing the actual delivery.

It should also be noted that as soon as the resetting operation is initiated the ticket is locked in place by pin 78. As a result, withdrawal of the ticket is prevented so that the attendant may not substitute others in an attempt to produce fraudulent sales tickets.

The card-board portion of the sales ticket is preferably of sufficient thickness to prevent transmission of impressions from the printing wheels to the several parts of a second ticket in the event the attendant places two tickets in slot 33 in an effort to make additional copies for fraudulent use when making later deliveries. The card-board part of the sales ticket is intended to be used as a serial number office copy and consequently the attendant is precluded from tearing it off in order to make fraudulent copies on parts of two tickets placed in slot 33.

Attention is also invited to the fact that even in the absence of locking lever 90, the ticket locking pin 78 acts to prevent insertion of a ticket after resetting of the register and printer has been initiated since the pin is projected into the path of a ticket and prevents proper registration of the latter with the printing wheels. As a consequence, the attendant cannot reset the register and printer, divert part of an intended delivery and then insert a ticket to receive a record figure indicative of the proper delivery when he delivers the remaining quantity to the customer.

Although an illustrative embodiment of our invention has been described in detail there are many changes and variations which may be made without departing from the spirit of the invention and, therefore, we desire and intend to include all such changes and variations within the scope of the appended claims.

We claim:

1. In a recorder having a printing device, including a platen and a printing wheel for printing a record ticket placed in registration therewith on a support, the combination of an operating member, means operable by said member to reset said printing wheel to its zero position, means responsive to said operation of the member for locking said ticket in printing position on the support, and means responsive to a further operation of said member, subsequent to resetting of said wheel, for effecting cooperation between said platen and wheel to print said ticket.

2. In a recorder having a printing device including a platen and a printing wheel for printing a record ticket placed in registration therewith on a support, the combination of an operating member, means operable by said member to reset said printing wheel to its zero position, means responsive to said operation of the member for locking said ticket in printing position on said support, and means responsive to further operation of said member, subsequent to resetting of said printing wheel, for effecting cooperation between said platen and said printing wheel to print said tcket and for releasing said locking means.

3. In a recorder having a printing device including a platen and a printing wheel for printing a ticket positioned in registration therewith on a support, the combination of resetting mechanism for said printing wheel, means for locking said ticket in printing position on the support, a shaft, operative connections between said shaft and said resetting mechanism, operative connections between said shaft and said printing device, operative connections between said shaft and said locking means for actuating the latter to lock a ticket in printing position and to release it, and an operating member for said shaft operable to actuate said shaft to initially reset said printing wheel and to lock said ticket in position and after locking the ticket to actuate said printing device for printing said ticket and to release said ticket after printing.

4. In a recorder having a printing device including a platen and a printing wheel for printing a ticket positioned in registration therewith on a support, the combination of resetting mechanism for said printing wheel, means for locking said ticket in printing position on the support, and an operating member associated with said resetting mechanism, said locking means and said printing device for operating the same, said operating member having a determined operating cycle initially effecting operation of said resetting mechanism and operation of said locking means to lock said ticket in printing position and upon subsequent operation to effect actuation of said printing device to print said ticket and unlocking of said locking means to release said ticket after printing.

5. In a recorder having a printing device including a platen and a printing wheel for printing a ticket positioned in registration therewith on a support, the combination of resetting mechanism for said printing wheel, an operating member, driving means for said resetting mechanism operable by said member, means operable by said member for actuating said platen to print said ticket, and means actuated by said operating member in a predetermined cycle for actuating said driving means and platen successively and for rendering said driving means inoperative during actuation of said platen.

6. In a recorder having a printing device including a printing wheel for printing a ticket positioned in registration therewith on a support, the combination of resetting mechanism for said printing wheel, means for locking said ticket in printing position on the support, an operating member, driving means for said resetting mechanism, means operable by said member for releasing said locking means to release said ticket, means actuated by said operating member in a predetermined cycle for successively actuating said driving means and said ticket locking means, and means for rendering said driving means inoperative during actuation of said locking means to release said ticket.

7. In a recorder having a printing device including a platen and a printing wheel for printing a ticket positioned in registration therewith on a support, the combination of resetting mechanism for said printing wheel, means for locking said ticket in printing position on the support, an operating member, driving means for the resetting mechanism operable by said member, means operable by said member for causing actuation of said platen to print said ticket and of said locking means to release said ticket, and means actuated by said operating member in a predetermined cycle for successively actuating said driving means and for rendering said driving means inoperative during actuation of said platen and release of said locking means.

8. A recorder having a printing device including impression means and a printing wheel for printing a ticket positioned in registration therewith on a support, the combination of resetting mechanism for said printing wheel, a ratchet operatively connected to said impression means for causing operation of the latter to print said ticket, a ratchet operatively connected to said resetting mechanism for operating the latter, an operating member, a pair of pawls operable by said member for actuating said ratchets, and means responsive to actuation of the impression means actuating pawl and ratchet for disabling the resetting mechanism actuating pawl to prevent operation of the resetting mechanism during operation of said impression means to print said ticket.

9. In a recorder having a printing device including impression means and a printing wheel for printing a ticket positioned in registration therewith on a support, the combination of resetting mechanism for said printing wheel, a pair of ratchets mounted in side-by-side relation, means associated with one of said ratchets for operating said impression means, means associated with the other ratchet and said resetting mechanism for driving the latter, an operating member, a pair of pawls operable by said member and each engaging one of said ratchets, said one ratchet having a notch of lesser depth than the remainder thereon and acting to raise the related pawl on engagement of the latter therewith, and means connecting said pawls acting upon actuation of the impression means actuating pawl and ratchet to disable the pawl engaging the resetting mechanism ratchet when the impression means pawl engages the said notch of lesser depth on said last-mentioned ratchet.

10. In a recorder having a printing device, including a platen and a rotatable printing wheel operable by the recorder in the operation thereof and cooperating with the printing device for printing a record ticket placed in registration therewith on a support, the combination of an operating member, means operable by said member to reset said printing wheel to its zero position, means responsive to said operation of said member for locking said ticket in printing position on the support, and means responsive to an operation of said member subsequent to resetting of said wheel for effecting cooperation between said platen and wheel to print said ticket.

11. In a recorder having a printing device including a platen and a printing wheel for printing a record ticket placed in registration therewith on a support, the combination of an operating member for resetting the printing wheel to zero position, means controlling operation of said member actuated by said ticket, and means responsive to operation of said operating member in resetting said printing wheels movable to lock ticket on said support in position for printing by said printing wheel, said locking means when moved to ticket locking position serving to prevent the insertion of a ticket into position to permit operation of the means controlling operation of said member.

12. In a recorder having a printing device including a platen and a printing wheel for printing a ticket positioned in registration therewith on a support, the combination of an operating member, ticket retaining means movable to ticket retaining position, means operable by said member for resetting said printing wheel to its zero position and for actuating said platen in a predetermined cycle, and means for moving said ticket retaining means to said ticket retaining position actuated by said member on movement of said member to reset said printing wheel and serving a retain said ticket retaining means in said ticket retaining position until said printing device is actuated.

13. In a recorder having a printing device including a platen and a printing wheel for printing a record ticket positioned in registry therewith, the combination of an operating member, control means actuated by said ticket on insertion thereof for releasing said member for performing a cycle of operations, means operable by said member in a predetermined cycle to reset said printing wheel to its zero position and thereafter to effect printing of said ticket by said platen and wheel, ticket retaining means movable by said member into a position to prevent removal of said ticket on operation of said member to reset said printing wheel, and means actuated by said member subsequent to printing of said ticket for moving said ticket retaining means to ticket releasing position, said control means being responsive to removal of said ticket to prevent initiation of a new cycle of operations by said member.

CHARLES S. HAZARD.
WILLIAM L. MARDEN.